United States Patent [19]

Aron

[11] Patent Number: 4,515,442
[45] Date of Patent: May 7, 1985

[54] OPTICAL FILTER DEVICE

[75] Inventor: Mitchell Aron, Harrington Park, N.J.

[73] Assignee: Allied Corporation, Morris Township, Morris County, N.J.

[21] Appl. No.: 344,658

[22] Filed: Feb. 1, 1982

[51] Int. Cl.$^3$ ............................. G02B 5/20; H04N 5/72
[52] U.S. Cl. ........................................ 350/397; 358/61; 358/253
[58] Field of Search ................... 358/42, 61, 252, 253; 350/397–399

[56] References Cited

U.S. PATENT DOCUMENTS

| | | | |
|---|---|---|---|
| 3,518,373 | 6/1970 | Cushera et al. | 178/7.85 |
| 3,537,306 | 11/1970 | Bedinger | 350/166 |
| 3,585,281 | 6/1971 | Jordan | 350/166 |

FOREIGN PATENT DOCUMENTS 788165 12/1954 United Kingdom .

OTHER PUBLICATIONS

*IBM Technical Disclosure Bulletin*, vol. 12, No. 10, Mar. 1970, pp. 1709–1710, New York L. B. Ii: "High-Contrast Filter".
*IBM Technical Disclosure Bulletin*, vol. 16, No. 3, Aug. 1973, pp. 745–746, New York, H. M. Murphy: "High--Contrast Optical Bandpass Filter".
*IBM Technical Disclosure Bulletin*, vol. 13, No. 5, Oct. 1970, pp. 1391–1392, New York, R. H. Mancini: "High Contrast Filter System".
*Proceedings of the Society for Information Display*, No. 7, Oct. 1966, pp. 47–49, Los Angeles K. P. Lally et al.: "Non-Linear Optical Filters for High Contrast Displays".
*Military Standardization Handbook*, "Optical Design", MIL-HDBK-141, Oct. 5, 1962.

*Primary Examiner*—Bruce Y. Arnold
*Attorney, Agent, or Firm*—S. N. Protigal; A. F. Cuoco

[57] ABSTRACT

An optical filter device is disclosed made up of a specially designed bandpass filter and a circularly polarizing filter and is typically used in front of the faceplate of a cathode ray tube in a high intensity ambient light environment, such as with navigation displays in some aircraft cockpits, to reduce the high intensity ambient light striking the phosphor of the cathode ray tube and thus effect a reduction in the level of the scattered light that causes a washout of the display thereon, thereby permitting observation of the display on the tube.

7 Claims, 5 Drawing Figures

OPTICAL FILTER DEVICE

BACKGROUND OF THE INVENTION

This invention generally relates to optical filter devices.

It has long been observed that cathode ray tube (CRT) displays are relatively unusable in high ambient light environments. This problem has impeded the use of CRTs for navigation and instrument displays in many aircraft, such as jet fighter aircraft, in which high ambient light conditions are normally experienced during day-light operation. This is particularly true for color displays. To overcome this problem, direction sensitive contrast enhancement optical filters have been developed which are mounted on the face-plate of the CRT. These filters effect a greater attenuation of ambient light that is scattered from the phosphor surface of a CRT than light that is generated by the phosphor. Thus a greater difference in brightness levels is achieved between the displayed data and the unactivated phosphor surface on which the data is displayed. As this difference in levels is increased, the display is seen more readily by the observer and is thus more effective. This is of great importance for CRT displays that are intended to be used in high ambient light environments.

These contrast enhancement filters typically comprise a plate having a large number of very small holes therethrough. The plate and the interior areas of all the holes are blackened to absorb ambient light that strikes it. Only the ambient light that goes through the holes, which is a small percentage of the ambient light, strikes the face of the CRT. Such filters allow an observer to see the display on the face of the CRT within a cone of vision in front of the CRT that is a function of the hole size and the thickness of the plate from which the filter is made. In the prior art, use of contrast enhancement filters of the type just described has been limited due to Moire interference patterns they create. This is especially true when used with shadow mask color CRTs.

Another solution to the useable display problem has been to place a spectrally selective filter matched to the spectral output of the CRT in front of the faceplate of a monochromatic CRT. While these filters selectively block light that is not the color of the filter from striking the phosphor, they are effective only when they transmit a small percentage of the light generated by the phosphor of the CRT to the observer. Typical percentages are from 10% to 20%.

Thus, there is a need in the art for a filter device which provides contrast enhancement, does not create Moire interference patterns and which passes a greater amount of useable light than heretofore possible in the art.

SUMMARY OF THE INVENTION

The foregoing needs of the prior art are satisfied by my novel optical filter device which is both spectrally and directionally selective, and which provides contrast enhancement. My novel optical filter device reduces Moire interference to a level where it is no longer objectionable and reduces the scattered light washout effect of high intensity ambient light from affecting the display provided by the CRT while transmitting substantially more light from the CRT to an observer than heretofore possible in the art.

To implement my novel optical filter device 1 utilize a first optical filter means and a second optical filter means, with the second optical filter means being closest to the faceplate of the CRT and the first optical filter means being furthest from the faceplate of the CRT. The first optical filter means is effective for passing light of a first sense only. The second optical filter means passes predetermined wavelengths of light having a color or colors which match the light generated by the CRT.

In the preferred embodiment of the invention the first optical filter means includes a circularly polarizing filter which only passes circularly polarized light of the first sense and also converts unpolarized light striking the filter to circularly polarized light of the first sense. The circularly polarized light typically contains light of all wavelengths. The first optical filter means also includes an anti-reflection coating on the front surface thereof which reduces the amount of ambient light incident upon the first optical filter means being reflected to interfere with the CRT display as seen by an observer. Only that portion of the circularly polarized light having said predetermined wavelengths will pass through said second filter means and strike the CRT. Circularly polarized light having wavelengths other than said predetermined wavelengths is reflected from the surface of the second filter means as circularly polarized light of a second sense which cannot pass back through the circularly polarizing filter to interfere with the display seen by the observer. Only a small amount of ambient light actually passes through both the circularly polarizing filter and the second filter means to the face of the CRT and therefore contributes very little to the degradation of the display as seen by the observer.

DESCRIPTION OF THE DRAWING

My novel optical filter device will be better understood upon reading the following detailed description in conjunction with the drawing in which.

DETAILED DESCRIPTION

Figure 1:
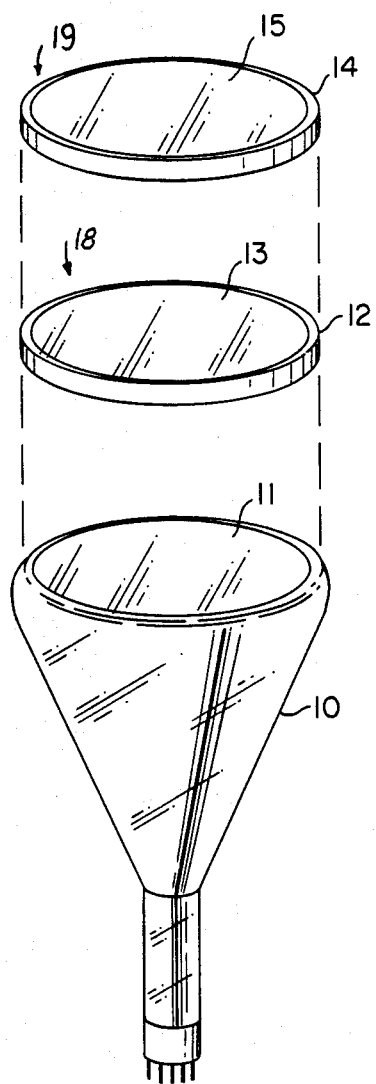
FIG. 1 shows an exploded isometric view of my novel optical filter device located in front of a cathode ray tube.
Figure 2:
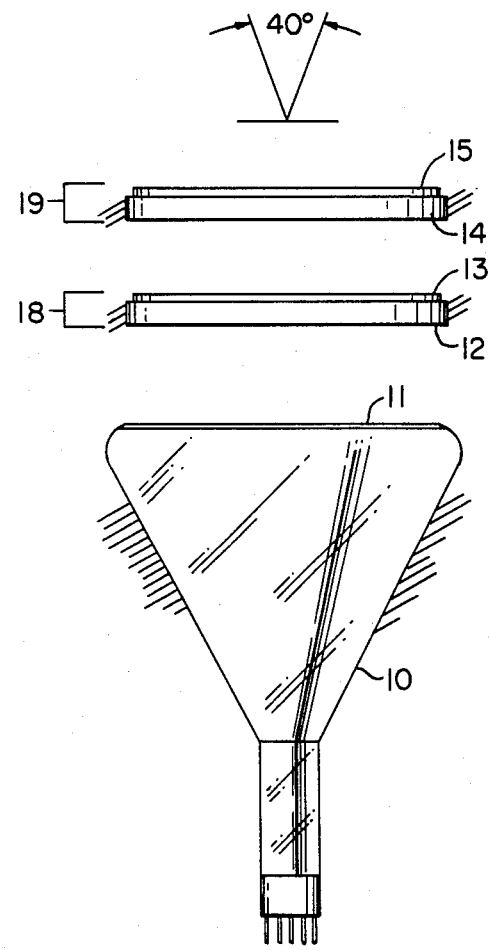
FIG. 2 shows the details of my novel optical filter device located in front of a cathode ray tube.
Figure 4:
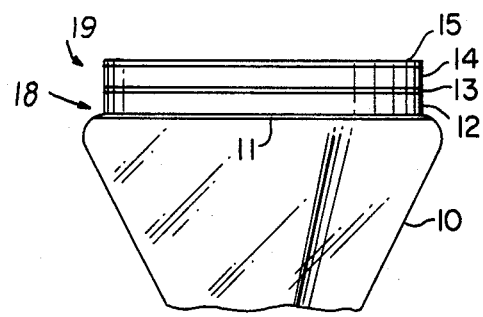
FIG. 4 shows my novel filter device bonded to the face plate of a cathode ray tube.

In FIGS. 1 and 2 are shown a conventional monochromatic cathode ray tube 10 having a phosphor 11 coated on its faceplate in a manner well known in the art. In the embodiment of the invention described herein phosphor 11 is a P43 phosphor, 70% of the light energy of which is radiated within a very narrow band in the vicinity of 545 nanometers wavelength. My novel optical filter device is made up of a first optical filter means 19 and a second optical filter means 18 and both filter means are located in front of the face of cathode ray tube 10 as shown. In FIG. 1 filter means 18 and 19 are shown disposed in spaced relation to each other and from the face of tube 10 primarily for ease of describing the present invention. However, in actual operation filter means 18 and 19 may be spaced from each other and from the face of tube 10 provided that ambient illumination is suitably prevented from reaching the phosphor surface other than through both filter means 18 and 19. In the preferred embodiment of the invention disclosed herein, first filter means 19 is bonded to the front of second filter means 18 and the bonded combination of the two filter means is bonded to the face of CRT 10 as shown in FIG. 4. This bonding process is achieved using a clear transparent bonding material that is commonly used by the industry to reduce or eliminate optical interface losses. First optical filter means 19 is made up of a circularly polarizing filter 14 which is coated with an anti-reflective coating 15. The circularly polarizing filter may be obtained from Polaroid Corporation. The anti-reflective coating is, for example, Magnesium Fluoride, Silicon Monoxide or other specially developed proprietary materials and is applied in a manner known in the art.

Figure 3:
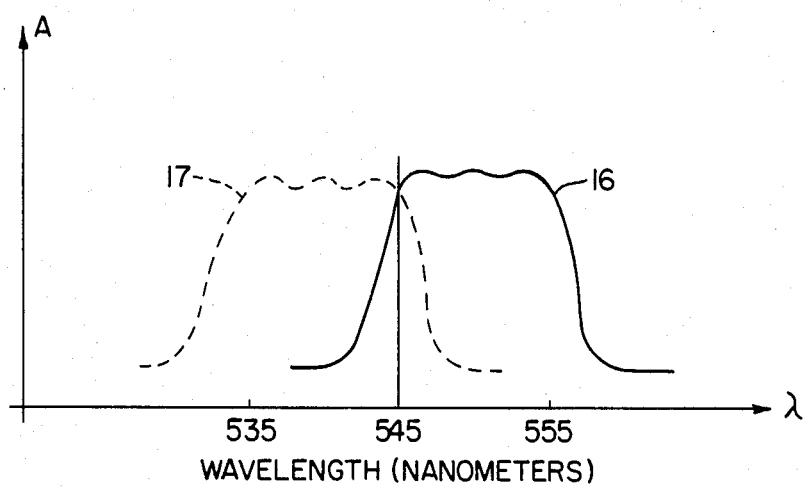
FIG. 3 shows the passband of a bandpass filter used in my novel optical filter device.

Second optical filter means 18 is made up of a glass plate 12 and has a thin film bandpass filter 13 deposited thereon which, for the embodiment of the invention disclosed herein, has a passband as shown in FIG. 3. The passband is for example 10 nanometers wide and is between 545 nanometers and 555 nanometers for light which is perpendicularly incident upon thin film filter 18. Filter 18 is available, for example, from Ditric Optics, Inc., 312 Main Street, Hudson, Mass. 01749. Thin film filter 13 is chosen to pass the 545 nanometer wavelength green light emitted by P43 phosphor 11 within CRT 10. Between 70% and 90% of the light within a narrow band in the vicinity of 545 nanometers emitted by P43 phosphor 11 passes through thin film filter 13. The circularly polarizing filter 14 in turn passes approximately 50% of this light. Thus from 35% to 45% of the 545 nanometer light is seen by an observer.

The particular thin film filter 13 used in the preferred embodiment of the invention has a characteristic passband shift as the angle of the incident light or the observer's line of sight is other than perpendicular which must be accounted for in designing the passband of the filter. White light made up of all colors and incident upon thin film filter 13 at zero degrees or perpendicular to the plane of filter 13 will have only its green portion passed through filter 13 while all other colors are specularly reflected from filter 13. That is, the angle of incidence of this circularly polarized light upon filter 13 equals the angle of reflection therefrom and there is no scattering of the light. As the angle of incidence from the normal increases the wavelength of light that will be selectively passed through filter 13 decreases. Saying it another way, when the angle of incidence, which is measured from the normal, is equal to zero degrees for both ambient light and light generated by phosphor 11, the passband of the filter is between 545 nanometers and 555 nanometers as shown by curve 16 in FIG. 3. As the angle of incidence increases from the normal to 20 degrees as shown in FIG. 2, for the phosphor generated light, defining a cone of vision of 40 degrees as created when the observer moves, the passband of the filter 13 shifts by 10 nanometers. As an example, this shift results in a passband of between 535 nanometers and 545 nanometers as shown by curve 17 in FIG 3. With the passband of thin film filter 13 being chosen as shown in FIG. 3, as the observer moves 20 degrees in any direction away from a line of sight perpendicular to filter 13 the light output seen by the observer remains essentially constant. Beyond this angle of incidence of 20 degrees there is a decrease in the light output seen by the observer. The passband can be varied in the design of the thin film filter and will vary with the desired cone of vision for the observer. The wider the passband the wider the cone of vision. However, the wider the passband and the cone of vision, the more ambient light will pass through my novel optical filter to strike phosphor 11. Thus, there must be a trade off between the angle of the cone of vision and display degradation due to ambient light hitting and being reflected from phosphor 11.

The primary purpose of my novel optical filter is to enable an observer to see the display on CRT 10 in high ambient light environments. My novel filter permits this operation and functions as is now described to remove the detrimental effect of high intensity ambient light which would destroy the visible display on CRT 10 without using my novel filter device. Referring again to FIG. 1, ambient white light will first strike anti-reflective coating 15 on circularly polarizing filter 14. In a manner well known in the art coating 15 causes most light that would normally be reflected from the surface of filter 14 to instead pass through circularly polarizing filter 14. Thus, non-reflective coating 15 reduces the amount of ambient light that is reflected from filter 14 back toward the observer.

The ambient white light which is incident upon circularly polarizing filter 14 is normally unpolarized or randomly polarized. For the description herein it will be assumed that circularly polarizing filter 14 has a clockwise sense. Circularly polarized light having a clockwise sense will pass through filter 14, whereas circularly polarized light having a counterclockwise sense will be blocked. Random linearly polarized light which is incident on the front surface of circularly polarizing filter 14 will pass through filter 14 but will be circularly polarized in the clockwise sense in the process. Thus, any light passing through circularly polarizing filter 14 exits therefrom as circularly polarized light having a clockwise sense.

White ambient light will pass through filter 14 as circularly polarized light at all angles of incidence. However filter 13 acts upon this circularly polarized ambient light, which is of a clockwise sense, in a selective manner that is dependent upon the angle of incidence of the ambient light. At each angle of incidence only a narrow 10 nanometer band of the broad spectrum ambient light will be transmitted by filter 13, and the center of this band will depend upon the angle of incidence. Light that is outside of this narrow band will be specularly reflected from filter 13 and will cause this rejected light to be circularly polarized with a counterclockwise sense, which will cause filter 14 which will pass light only when it is polarized with a clockwise sense, to be attenuated and thus prevented from reaching the observer.

As previously noted 10 nanometer bands of light do reach the phosphor through filter 13. However the action of filter 13 is such that a significant portion of this light is prevented from reaching the observer. Thus, for example, ambient light at a zero degree angle of incidence will pass through only for light that is within the 545 nanometer to 555 nanometer band. For light entering at a 10 degree angle of incidence the band is 535 to 545 nanometers. Similarly, at greater angles of incidence the 10 nanometer band continues to shift toward the blue region of the spectrum. All of these 10 nanometer bands pass through filter 13 and are scattered after they strike the phosphor surface. However, since the observer is viewing the display at a center line of sight of zero degrees, the only light that will return through the filter within his field of vision is light that is in the 545 to 555 nanometer band. Since a major part of the light that reached the phosphor is outside this passband, only a very small portion of the light scattered by the phosphor will be seen by the observer.

Thus, by designing filter 13 so that it has a flat passband over a defined band of wavelengths, I have shown how I can take advantage of the shifting passband to build a direction sensitive filter that is more efficient as regards both the ability to transmit the desired phosphor light and to attenuate the deleterious effects of ambient light.

My invention may also be used with multicolor displays on CRTs. To accomplish this, another thin film filter may be manufactured to provide the same beneficial operation. Such a color CRT may be a beam penetration tube, well known in the art, which provides discreet color outputs at, for example, three distinct colors. A conventional shadow mask CRT may also be used wherein 3 colors are provided plus any combination of these 3 colors. In the manufacture of such a thin film filter for multicolor filtering, the different thin film layers first provide a first filter wherein wavelengths shorter than a certain value are passed, which waveolengths of light include the wavelengths of the desired discrete colors. A second filter is placed on top of the first filter which passes wavelengths longer than a certain value and includes the wavelengths of the desired discrete colors. The combination of these two filters passes a band of wavelengths including the wavelengths of all the desired discrete colors. Thereafter, band rejection filters are utilized having rejection bands within the last mentioned band of wavelengths to block all wavelengths of light between the wavelengths of each of the desired discreet colors. In this manner the composite thin film filter only passes the wavelengths of the desired discreet colors and rejects all other wavelengths. This composite thin film filter, in conjunction with the circularly polarizing filter, provides operation of my novel optical filter with color displays.

Figure 5:
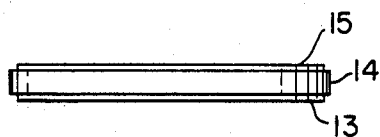
FIG. 5 shows an alternative embodiment of my invention wherein the thin film filter is deposited directly on the circularly polarizing filter.

While what has been described above is a preferred embodiment of the invention operating at a specific wavelength, and an alternate embodiment operating at multiple wavelengths, those skilled in the art may make changes without departing from the spirit and scope of the invention. For example, my novel optical filter may be made as a single piece as shown in FIG. 5. The circularly polarizing filter 14 may have the anti-reflective coating 15 on one side of it and the thin film bandpass filter 13 deposited on the other side of it. In addition, the multicolor version of my filter can be made wherein one or more bands can be made using special glasses, that exhibit transmission and/or rejection properties that match the selected phosphor light outputs. Further, other optical elements may be added between the circularly polarizing filter and the thin film filter to perform other functions such as, for example, allowing the two last mentioned filters to be located at right angles to each other. One skilled in the optical art would also realize that a highpass filter passing, for example, visible red and longer wavelengths may be utilized instead of a bandpass filter to implement my novel optical filter device for use with a red display.

One skilled in the optical art would also realize that my novel optical filter device may be used in any application where it is desired to pass predetermined wavelengths of light in one direction through the filter device while substantially blocking light from passing through in an opposite direction.

What is claimed is:

1. An optical filter device passing therethrough in a specified direction light having predetermined wavelengths within a predetermined range of incidence angles while substantially blocking light which originally is travelling in the opposite direction to said specified direction and is reflected back to travel in said specified direction, from passing therethrough comprising:

a first optical filter for converting light passing therethrough in said opposite direction to a first predetermined sense, said first optical filter substantially passing only light having said first sense;

a second optical filter, in a cooperative relationship with said first optical filter, which passes light within a specified range of wavelengths and rejects light having wavelengths other than said specified range of wavelengths, said specified range of wavelengths shifting in accordance with the angle of incidence of the light and the design of said second optical filter, wherein light travelling opposite to said specified direction passes first through said first optical filter and is converted to said first predetermined sense before impinging upon said second optical filter, and wherein the first predetermined sense light, having wavelengths other than said predetermined wavelengths of light, is reflected from said second optical filter and is thereby converted to a second predetermined sense wherein it is unable to pass back through said first optical filter;

wherein said second optical filter has a wavelength shifting characteristic as a function of incidence angle sufficient to ensure that, light which has been scattered and reflected and is incident on said second optical filter in the specified direction will be substantially blocked thereby as a result of said shifting.

2. The invention in accordance with claim 1 wherein said first optical filter comprises a circularly polarizing filter.

3. The invention in accordance with claim 2 wherein said second optical filter comprises a thin film filter.

4. The invention in accordance with claim 2 wherein said second optical filter comprises:

a highpass filter blocking all wavelengths of light longer than any of said predetermined wavelengths of light, a lowpass filter blocking all wavelengths of light shorter than any of said predetermined wavelengths of light, said lowpass filter and said highpass filter cooperating to pass only a band of wavelengths of light including all of said predetermined wavelengths of light, and band rejection filters having rejection bands within said band of wavelengths and blocking the wavelengths of light between said predetermined wavelengths of light, said highpass filter, said lowpass filter and said band rejection filters cooperating to pass only light having said predetermined wavelengths of light.

5. The invention in accordance with claim 3 or 4 wherein said first optical filter further comprises a nonreflective coating on the side of said circularly polarizing filter upon which said light to be blocked from said opposite direction first impinges.

6. The invention in accordance with claim 5 wherein said thin film filter is on said circularly polarizing filter on the side thereof opposite the side upon which is said nonreflective coating.

7. The invention in accordance with claim 3 wherein said circularly polarizing filter is bonded to said thin film filter.

* * * * *